(12) United States Patent
Afriat et al.

(10) Patent No.: US 7,839,387 B2
(45) Date of Patent: Nov. 23, 2010

(54) METHOD, SENSING DEVICE AND OPTICAL POINTING DEVICE INCLUDING A SENSING DEVICE FOR COMPARING LIGHT INTENSITY BETWEEN PIXELS

(75) Inventors: Gil Afriat, Monument, CO (US); James Harold Lauffenburger, Colorado Springs, CO (US); Kevin Scott Buescher, Colorado Springs, CO (US)

(73) Assignee: EM Microelectronic-Marin SA, Verden (CH)

( * ) Notice: Subject to any disclaimer, the term of this patent is extended or adjusted under 35 U.S.C. 154(b) by 885 days.

(21) Appl. No.: 11/262,970

(22) Filed: Nov. 1, 2005

(65) Prior Publication Data
US 2007/0171204 A1    Jul. 26, 2007

(51) Int. Cl.
G06F 3/033 (2006.01)
G09G 5/08 (2006.01)
G06M 7/00 (2006.01)
G05F 1/00 (2006.01)

(52) U.S. Cl. .................. 345/166; 250/221; 323/284

(58) Field of Classification Search ......... 345/156–184, 345/104; 250/205, 201.3, 221, 370.08; 382/312; 715/857; 359/506; 702/58; 323/284–285; 713/300
See application file for complete search history.

(56) References Cited

U.S. PATENT DOCUMENTS

| | | | |
|---|---|---|---|
| 5,525,764 A * | 6/1996 | Junkins et al. | 178/18.01 |
| 5,594,238 A * | 1/1997 | Endruschat et al. | 250/221 |
| 6,806,458 B2 * | 10/2004 | Rotzoll et al. | 250/221 |
| 2003/0051177 A1 * | 3/2003 | Koo | 713/300 |
| 2003/0102425 A1 * | 6/2003 | Rotzoll et al. | 250/221 |
| 2003/0121978 A1 * | 7/2003 | Rubin et al. | 235/462.1 |
| 2004/0130532 A1 * | 7/2004 | Gordon et al. | 345/166 |
| 2004/0189603 A1 * | 9/2004 | Arrigo et al. | 345/158 |
| 2005/0062720 A1 * | 3/2005 | Rotzoll et al. | 345/166 |
| 2006/0164390 A1 * | 7/2006 | Bianchessi | 345/157 |

* cited by examiner

*Primary Examiner*—Alexander Eisen
*Assistant Examiner*—Liliana Cerullo
(74) *Attorney, Agent, or Firm*—Sughrue Mion, PLLC

(57) ABSTRACT

A method for operating an optical motion sensing device comprising a light source and a photodetector device, said method comprises the steps of: a) illuminating a surface portion with radiation by means of the light source; b) detecting radiation patterns reflected from the illuminated surface portion by means of the photodetector device; c) extracting motion features from the detected radiation patterns by comparing light intensity between neighbouring pixels of said photodetector device by means of comparators with a determined hysteresis threshold; d) detecting and measuring displacement with respect to the illuminated surface portion based on said extracted motion features; e) determining whether the optical motion sensing device is moving or at rest; f) adjusting said determined hysteresis threshold of the comparators between at least a low and a high hysteresis values, consisting in selecting said low hysteresis value when the optical motion sensing device is moving and selecting said high hysteresis value when the optical motion sensing device is at rest.

24 Claims, 8 Drawing Sheets

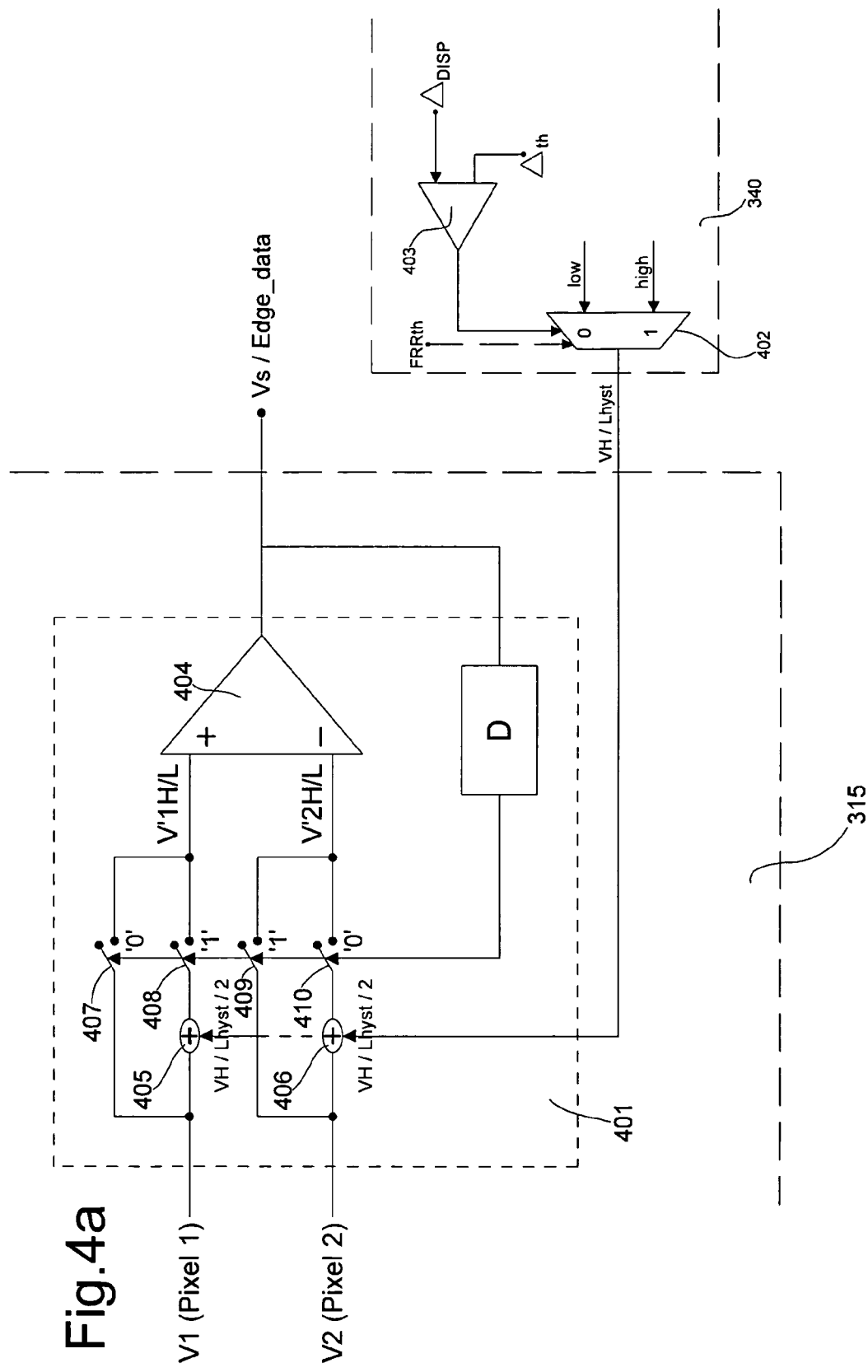

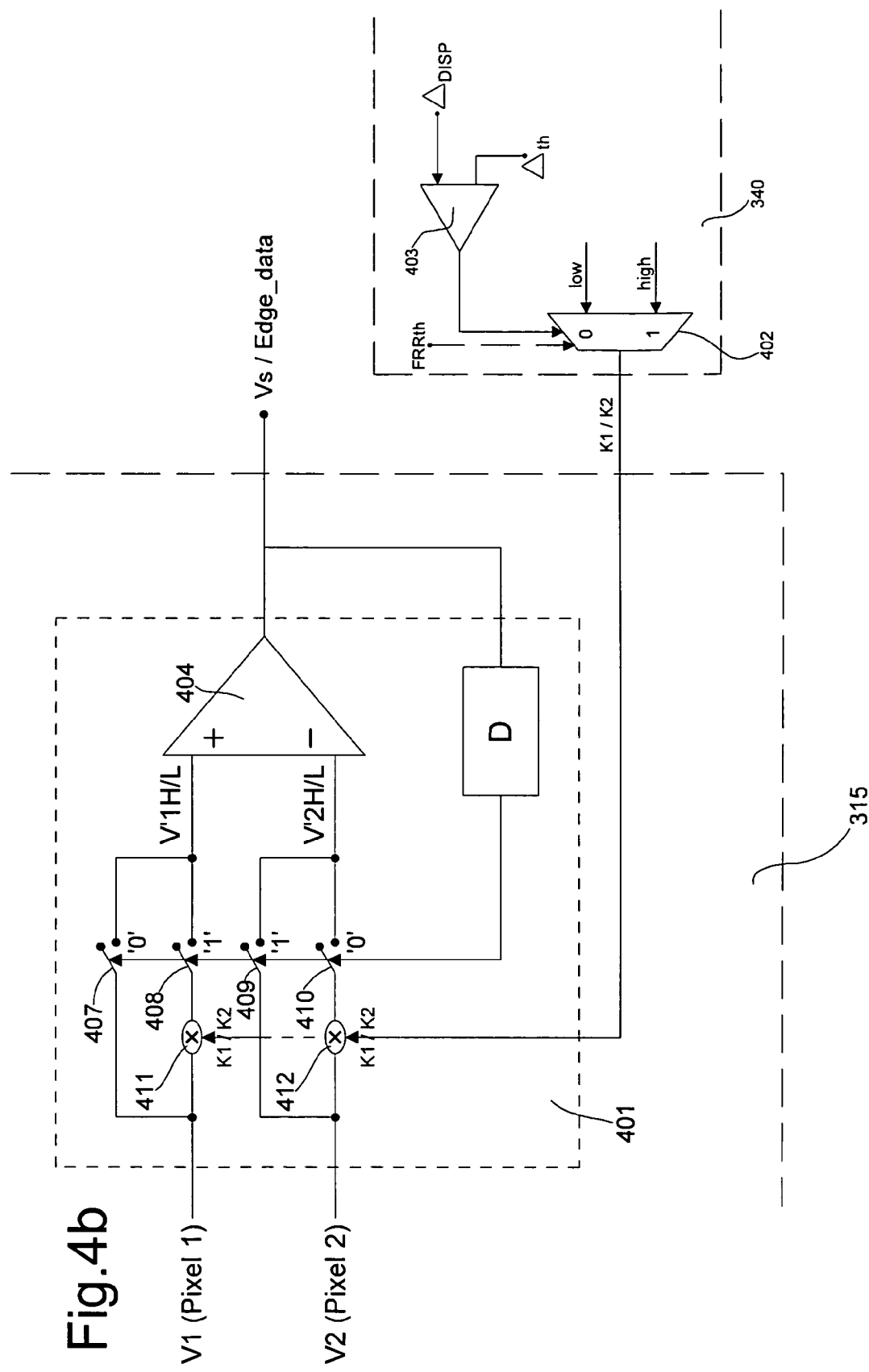

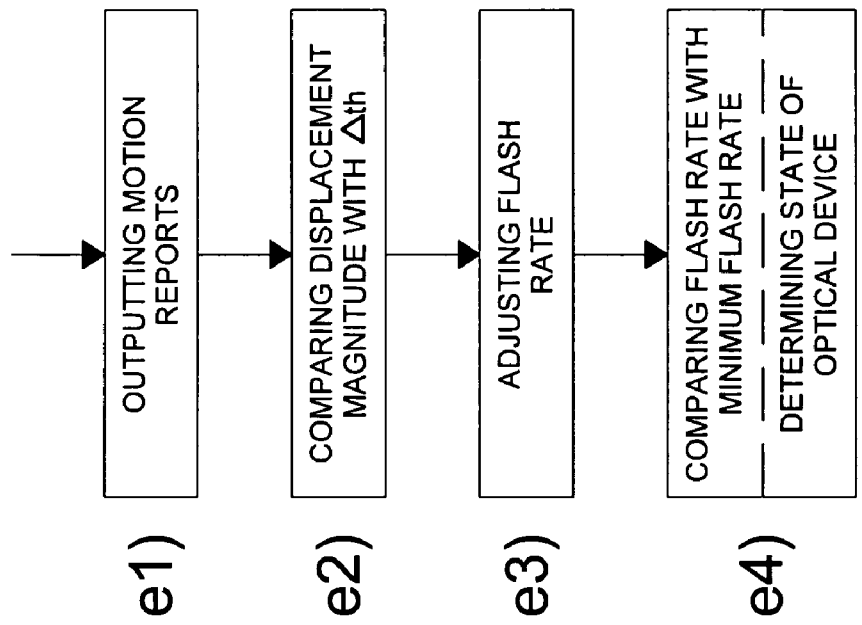
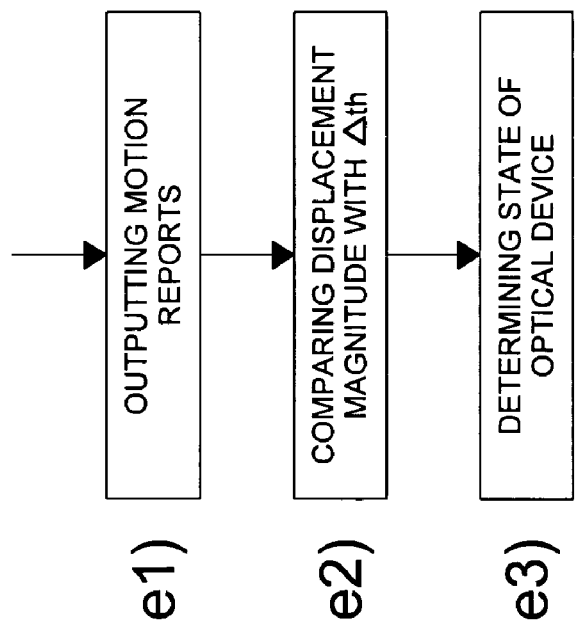

US 7,839,387 B2

METHOD, SENSING DEVICE AND OPTICAL POINTING DEVICE INCLUDING A SENSING DEVICE FOR COMPARING LIGHT INTENSITY BETWEEN PIXELS

FIELD OF THE INVENTION

The present invention generally relates to pointing devices, in particular for controlling the position of a cursor on a screen, such as the display of a personal computer, workstation or other computing devices having a graphic user interface. Such pointing devices may for instance include mice, trackballs and other computer peripherals for controlling the position of a cursor on a display screen.

The present invention more particularly relates to the field of optical pointing devices which comprise an optical motion sensing device including a photodetector array for measuring the varying intensity pattern of a portion of a surface which is illuminated with radiation and for extracting information about the relative motion between the photodetector array and the illuminated portion of the surface.

BACKGROUND OF THE INVENTION

Optical pointing devices are already known in the art. U.S. Pat. No. 6,806,458, filed in the name of the same Assignee and which is incorporated in its entirety herein by reference, for instance discloses a method, a sensing device as well as an optical pointing device including a sensing device for comparing light intensity between pixels.

FIG. 1 is a generalized schematic bloc diagram of an optical pointing device in accordance with the prior art. It comprises a photodetector array 120 including a plurality of pixels, this photodetector array 120 being coupled to processing means 100 (or motion detection processing circuit) which consists, in a non limiting manner, of a micro-controller, microprocessor or other adequate logic circuitry for processing the signals outputted by the photodetector array 120. Motion detection processing circuit 100 in particular includes accumulator circuits and other logic circuits for performing mathematical and logic operations. A comparator array 115 may be interposed between processing means 100 and array 120, this comparator array 115 including a plurality of comparator circuits each for comparing the light intensity of a first pixel of array 120 with the light intensity of a second pixel of array 120 and for outputting a resulting edge direction condition. It will basically be understood that each comparator circuit may alternatively be incorporated in the active region of each pixel.

The optical pointing device further comprises at least one light source 110 (or more) such as a LED, which produces radiation, preferably monochromatic (such as visible or non-visible light—preferably infrared light), that impinges on a portion of a surface S.

Processing means 100 is essentially designed to intermittently sample the pixel outputs of photodetector array 120 in accordance with a defined sequence. The edge information of two successive samples is compared and a relative motion measurement is extracted by processing means 100. The adequate cursor control signals are then derived from the relative motion measurement and transmitted to the host system via line interface 150.

The imaging technique used in order to extract motion-related information is based on a so-called "Edge Motion Detection" technique, which essentially consists in a determination of the movement of edges (i.e. a difference between the intensity of pairs of pixels) in the image detected by the photodetector array. Edges are defined as spatial intensity differences between two pixels of the photodetector array. Relative motion of edges is determined by comparing the position of these edges in the photodetector array at a first point in time with the position of edges in the photodetector array at a subsequent point in time. The light source (such as an infrared LED) intermittently illuminates the portion of the surface in accordance with a determined sequence, and the pixel outputs of the photodetector array are sampled in accordance with the determined sequence to provide two successive sets of edge data that are compared to each other in order to determine a relative motion measurement. Thus, the relative motion of each of these edges is tracked and measured so as to determine an overall displacement measurement which is representative of the relative movement between the photodetector array and the illuminated portion of the surface.

A differential technique may be used in order to determine an edge condition between two pixels. An edge is defined between two pixels if the ratio of intensities of the two photosensitive elements is larger than a determined level. A hysteresis threshold may be provided when comparing pixel intensities. In this respect, the comparator output will depend from its previous state and from the hysteresis threshold. An edge may thus be defined mathematically by the following programming loop:

IF (last_comparator_state ='0' AND Intensity [PIXEL 1] > (Intensity [PIXEL 2] + Vhyst/2)); THEN (comparator_output ='1');
ELSE IF (last_comparator_state ='1' AND (Intensity [PIXEL 1] + Vhyst/2) < Intensity [PIXEL 2]);
THEN (comparator_output ='0');
ELSE (comparator_output = last_comparator_state).

where Vhyst is an hysteresis window in Volts.

It will be appreciated that the above programming loop allows defining an edge condition between the two pixels.

Alternatively a "scaled" hysteresis function may be implemented, where the hysteresis window is a percentage of the pixel output value. Then an edge may be defined mathematically by the following programming loop:

IF (last_comparator_state ='0' AND Intensity [PIXEL 1] > K Intensity [PIXEL 2]);
THEN (comparator_output ='1');
ELSE IF (last_comparator_state ='1' AND K Intensity [PIXEL 1] < Intensity [PIXEL 2]);
THEN (comparator_output ='0');
ELSE (comparator_output = last_comparator_state).

where K is a selected scaling factor being greater than 1.

The scaling factor K may be adjusted so that the sensing device is less sensitive to analog measurement noise. In practice, it would be desirable to implement a hysteresis function in the sensing device. U.S. Pat. No. 6,806,458 provides a solution that shows flexibility and allows adjustment of the scaling factor K and/or implementation of a hysteresis function that allows sensitivity to noise to be reduced.

One example of method for comparing light intensity between neighbouring pixels is described with reference to FIG. 2. Four pixels designated P0 to P3 aligned along an axis are depicted, as well as three comparator circuits COMP1 to COMP3, these comparator circuits being part of a separate comparator array as shown in FIG. 1 (comparator array 115). Each comparator circuit compares light intensity between two neighbouring adjacent pixels. As illustrated, light intensity detected by pixel P0 is for instance compared by comparator circuit COMP1 with the light intensity of pixel P1 Similarly, comparator circuits COMP2 and COMP3 are respectively coupled to pixels P1, P2 and P2, P3. It will be appreciated that other possibilities for comparing light intensity between non-adjacent neighbouring pixels may be envisaged as well. Some alternatives are given for example in US Patent Publication No. 2005/062,720 and in U.S. Pat. No. 6,806,458, filed in the name of the same Assignee and incorporated herewith by way of reference.

As regards the comparison steps performed by the comparator circuits in order to extract the required edge direction data, those steps are performed with implementation of a hysteresis function. The use of comparator circuits with hysteresis prevents randomness of the edge direction condition between first and second pixels showing equal or nearly equal light intensity levels. Further, such a hysteresis window is really important in terms of noise immunity and for the elimination of false motion detection while the optical pointing device is not moving, i.e. at rest. Such false motion is usually detected on low contrast surfaces, which exhibit a small delta of light intensity on the edge comparator inputs. This results in a costly implementation in terms of power consumption, since it may prevent the optical pointing device from entering sleep mode or conversely will wake up frequently and unnecessarily the system from sleep mode.

However, such a "hard" setting of the hysteresis function of these light intensity comparators is problematic, since fixing the hysteresis value calls for a trade off between the rate of false motion detection and thus power consumption and the ability of the sensing device to detect motion. On the one hand, if the hysteresis threshold of the light intensity comparators is set low then the motion sensing device will always detect motion even if the optical pointing device is at rest, and on the other hand, if the hysteresis threshold is set high, then the motion sensing device may not detect any motion especially on low contrast surfaces even when the optical pointing device is moving.

SUMMARY OF THE INVENTION

One goal of the present invention is thus to implement a reliable method for operating an optical motion sensing device in order to prevent false motion detection and excessive power consumption when the optical pointing device is at rest and to ensure a reliable motion tracking even on low contrast surfaces when the optical pointing device is moving.

For that purpose, the method for operating an optical motion sensing device comprising a light source and a photodetector device, comprises the steps of: a) illuminating a surface portion with radiation by means of the light source; b) detecting radiation patterns reflected from the illuminated surface portion by means of the photodetector device; c) extracting motion features from the detected radiation patterns by comparing light intensity between neighbouring pixels of said photodetector device by means of comparators with a determined hysteresis threshold; d) detecting and measuring displacement with respect to the illuminated surface portion based on the extracted motion features; e) determining whether the optical motion sensing device is moving or at rest; f) adjusting the determined hysteresis threshold of the comparators between at least a low and a high hysteresis values, consisting in selecting the low hysteresis value when the optical motion sensing device is moving and selecting the high hysteresis value when the optical motion sensing device is at rest.

Thus, the principle according to this method consists in adjusting the comparators hysteresis value in function of the state in which the optical motion sensing device is. On low contrast surfaces, noise might increase to a level such that motion will be detected even if the mouse is not moving. Therefore, the hysteresis value is increased when the mouse is at rest (i.e. not moving) and decreased when the mouse is moving, thereby preventing the mouse from wrongly detecting motion when at rest.

Another goal of the present invention is to implement an optical motion sensing device to carry out aforementioned method. Such an optical motion sensing device comprises a light source for illuminating a surface portion with radiation; a photodetector device responsive to radiation reflected from the illuminated surface portion; a comparator array comprising a plurality of comparators with a determined hysteresis threshold for extracting motion features by comparing intensity between pixels of the photodetector device; a motion sensing unit coupled to the comparator array for detecting and measuring displacement with respect to the illuminated surface portion, wherein it further comprises a control unit for determining the state of the optical motion sensing device whether it is moving or at rest and adjusting the hysteresis threshold of the comparators of the comparator array between at least a low and a high values in function of the determined state.

The present invention also concerns an optical pointing device for controlling the position of a cursor on a display screen, comprising such an optical motion sensing device.

The present invention further concerns an optical mouse for controlling the position of a cursor on a display screen, comprising such an optical motion sensing device.

Furthermore, other advantageous embodiments form the subject of the dependent claims.

BRIEF DESCRIPTION OF THE DRAWINGS

Other aspects, features and advantages of the present invention will be apparent upon reading the following detailed description of non-limiting examples and embodiments made with reference to the accompanying drawings.

FIG. 4a is a schematic illustration of one implementation example of a comparator with two hard hysteresis values;

FIG. 4b is a schematic illustration of another implementation example of a comparator with two relative hysteresis values;

FIG. 5 is a diagram showing the evolution of the comparator output of FIG. 4a;

FIGS. 7a and 7b show two variants for detecting the state of an optical motion sensing device according to two methods of the invention.

DETAILED DESCRIPTION OF THE INVENTION

The following description, which concerns an optical motion sensing device having automatic adjustable hysteresis comparators and the corresponding method for automatically adjusting the hysteresis function of these comparators, is given by way of a non limiting example in relation with FIGS. 3 to 7b.

Figure 1:
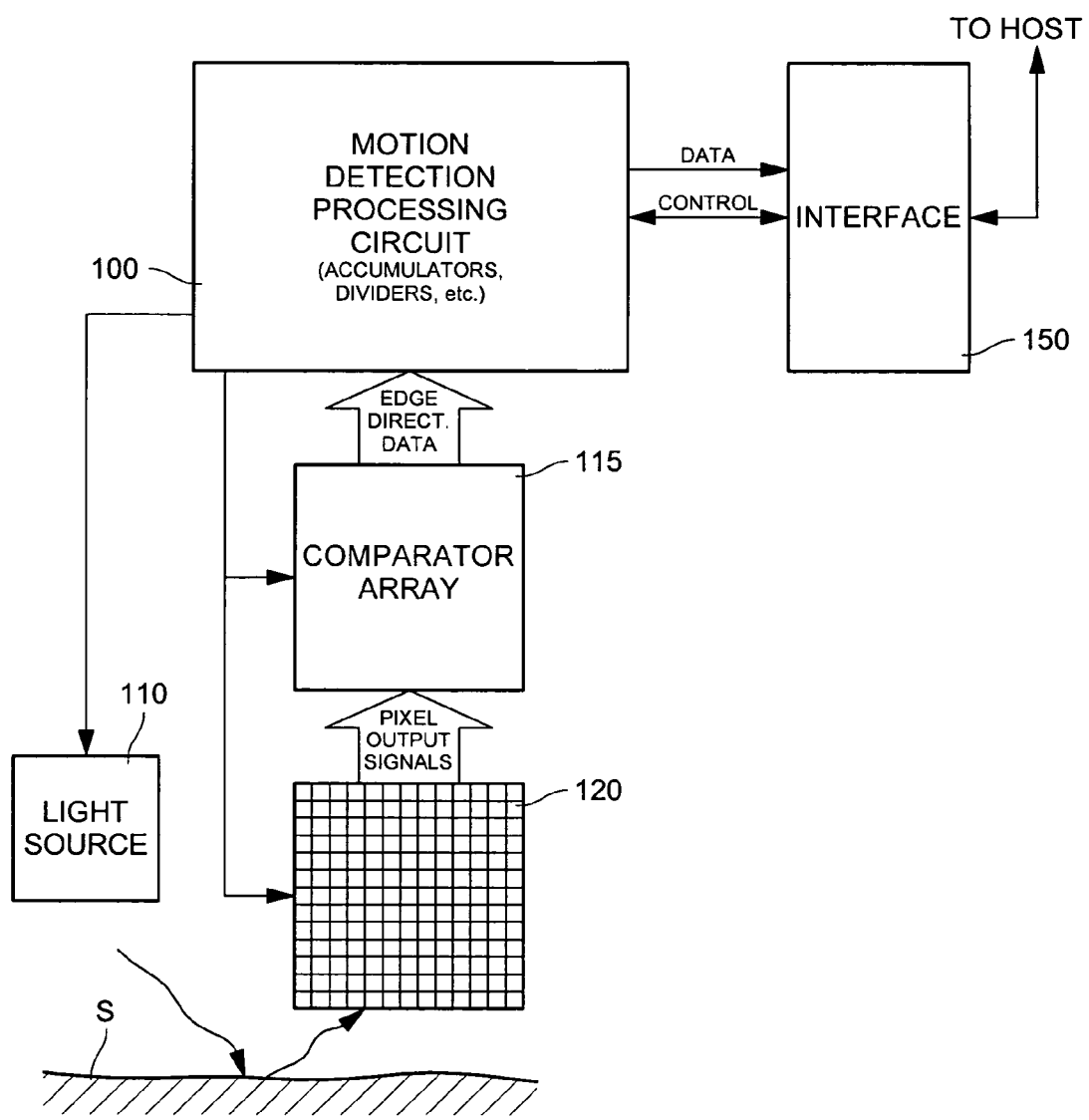
FIGS. 1 and 2, already described, are schematic illustrations of an optical motion sensing device according to the prior art.
Figure 2:
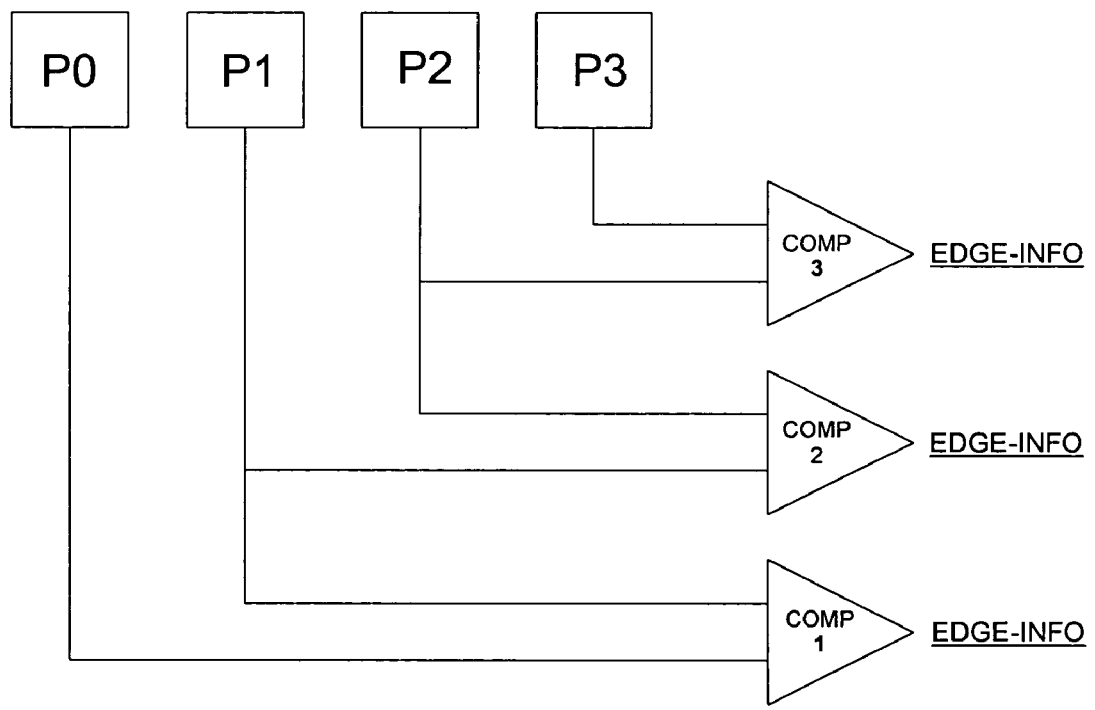
Figure 3:
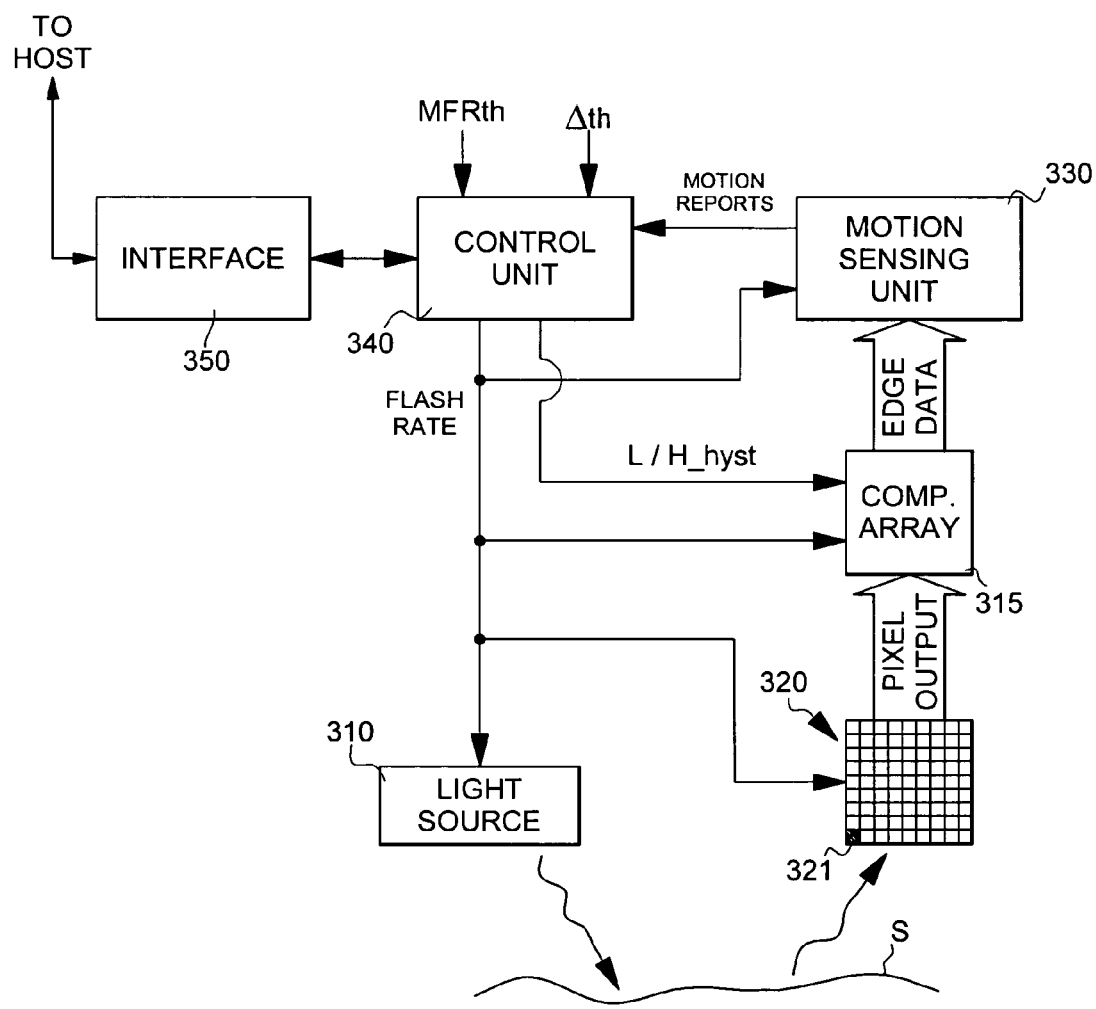
FIG. 3 is a schematic illustration of an optical motion sensing device according to one embodiment of the invention.

Likewise FIG. 1, FIG. 3 is a schematic illustration of an optical pointing device. It basically consists in an optical sensing system comprising a light source 310 for illuminating a portion of a surface S with radiation, a photodetector device 320 which may be in the form of a photodetector array including a plurality of pixels, responsive to radiation reflected from the illuminated surface portion S, and a motion sensing unit 330, coupled to the output of photodetector device 320, for detecting and measuring displacement with respect to the illuminated surface portion S. A comparator array 315 including a plurality of comparator circuits, each comparing the light intensity of a first pixel of array 320 with the light intensity of a second pixel of array 320 and for outputting a resulting edge direction condition, is either interposed between motion sensing unit 330 and array 320, or alternatively each comparator circuit is incorporated in the active region of each pixel.

During each period of activation, or flash, light source 310 is activated to illuminate surface portion S, photodetector device 320 is activated to capture an image or intensity pattern of the illuminated surface portion S and motion sensing unit 330 is activated to detect and measure relative motion with respect to the illuminated surface portion S based on a comparison done by means of comparator array 315 of the intensity pattern detected by photodetector device 320 and a previous intensity pattern detected during a previous flash period. Motion sensing unit 330 outputs motion reports that are each representative of a magnitude of the detected relative motion. The rate at which activation of light source 310, photodetector device 320, comparator array 315 and motion sensing unit 330 is repeated, is defined as the "flash rate".

This flash rate may be set initially when manufacturing the optical pointing device, but advantageously the flash rate is dynamically adjustable in function of the detected motion. For that purpose, the optical motion sensing device further comprises a control unit 340 which may adjust the flash rate as a function of the magnitude of the detected relative motion based on the motion reports from motion sensing unit 330. More particularly according to this preferred embodiment with adjustable flash rate, control unit 340 is adapted to compare the magnitude of the detected relative motion with a determined relative motion magnitude threshold $\Delta$th, and increases, respectively decreases, the flash rate if the magnitude of the detected relative motion is greater, respectively lower, than the determined threshold $\Delta$th. It should be noted that increase of the flash means that the time decreases between flashes and decrease of the flash rate means that the time increases between flashes. For more details how to adjust the flash rate, one could refer to the US Patent Publication No 2005/0001153 filed in the name of the same Assignee and enclosed herewith by way of reference.

According to a first variant, control unit 340 may be further adapted to compare the adjusted flash rate with a determined rest flash rate threshold FRRth. If the current flash rate is greater than this rest flash rate then the optical motion sensing device is considered as moving and if the current flash rate is equal to or below the rest flash rate then the optical motion sensing device is considered to be at rest.

Alternatively, according to a second variant control unit 340 may be adapted to check both if the current flash rate is equal to or below the rest flash rate and if the displacement magnitude is still below the magnitude threshold $\Delta$th, to consider the optical motion sensing device as being at rest.

Furthermore, control unit 340 may be adapted to communicate in a bi-directional manner with a line interface 350 that communicates in turn with a host system (not illustrated). Cursor control signals (and eventually other signals related to the optical pointing device) are supplied to the host system. Control unit 340 may also receive information, such as configuration signals from the host system.

One will easily understand that motion sensing unit 330 and control unit 340 may be implemented together so as to form processing means consisting in a non limiting manner, of a micro-controller, microprocessor or other adequate logic circuitry for processing the signals outputted by the photodetector array 320.

The optical pointing device according to the present invention is particularly advantageous because control unit 340 is furthermore adapted to set the hysteresis value of the comparators of comparator array 315 in function of the state of the optical motion sensing device. According to a first and simple implementing way, comparators of comparator array 315 have two hysteresis values being set if the optical motion sensing is either moving or at rest. Two non-limiting examples of such comparators having two hysteresis levels are shown in FIGS. 4a and 4b. Determination of the state, either moving or at rest, may be easily detected by directly comparing the magnitude of the displacement with a minimum displacement magnitude threshold or alternatively and preferably by detecting either, according to the first aforecited variant, that the flash rate is set to a value equal to or lower than the rest flash rate or, according to the second aforecited variant, that the flash rate is set to a value equal to or lower than the rest flash rate and if so that the displacement magnitude is lower than a minimum displacement magnitude threshold.

According to a preferred embodiment of the present invention, if the optical motion sensing device is considered to be moving then control unit 340 will set a low hysteresis value for comparators of comparator array 315 by means of the L/H_hyst control signal. Such a low hysteresis value for the comparators of comparator array 315 enables the motion sensing unit to still track motion reasonably even on very low contrast surfaces. Conversely, if the optical motion sensing device is considered to be at rest, control unit 340 will set a high hysteresis value for comparators of comparator array 315 by means of this L/H_hyst control signal. Such a high hysteresis value reduces the probability for false motion reports and thus enables the optical motion sensing device to enter more easily sleep mode and consequently to save power.

FIG. 4a is a schematic illustration of one implementation example of one comparator of comparator array 315 with two hard hysteresis levels. Each of these comparators of the comparator array compares light intensity between neighbouring pixels of the photodetector device and transmits edge data to motion the sensing unit (both not shown). In turn, the motion sensing unit transmits to control unit 340 motion reports determined according to the "Edge Motion Detection" technique. For sake of simplicity, only elements of control unit 340 used in relations with comparator array 315 are represented in FIG. 4. It should be noted that motion reports may also be determined according to other motion detection algorithms such as the so-called "Peak/Null Motion Detection" algorithm disclosed in the US Patent Publication No 2005/0062720 or the so-called "Line Feature" algorithm (see U.S. patent application Ser. No. 11/020,108) or also the so-called "Angle Error Correction" algorithm (see U.S. patent application Ser. No. 11/101,563) or any other suitable motion detection method. All these U.S. patent applications have been filed in the name of the same Assignee and are incorporated herewith by way of reference.

Comparator 401 receives at a first input a voltage V1 corresponding to the light intensity measured on a first pixel (pixel 1) and at a second input a voltage V2 corresponding to the light intensity of a second pixel (pixel 2) and outputs a its output Vs and edge data depending from the comparison between both inputs.

As already seen in relation with FIG. 3, control unit 340 determines whether the optical motion sensing device is moving or at rest based on the comparison of the displacement magnitude Δdisp measured and a minimum displacement magnitude threshold Δth. Alternatively, control unit 340 may further check if the flash rate is equal to or below its rest flash rate value. Whichever variant is implemented, if the optical motion sensing device is considered to be moving, control unit 340 sets the hysteresis value of comparator 401 to a low value ($V_{Lhyst}$) and if the optical motion sensing device is considered to be at rest, control unit 340 sets the hysteresis value of comparator 401 to a high value ($V_{Hhyst}$). This setting may be simply implemented by means of a multiplexer 402, or any other suitable device for controlling the hysteresis value of comparator 401 in function of the comparison result, the multiplexer receiving on the one hand the result of magnitude comparison and, in case of need, the result of flash rate comparison and, on the other hand, low and high setting values of hysteresis. At the multiplexer output a control signal $V_{H/Lhyst}$ is generated in function of the state of the optical motion sensing device and provided to comparator 401. If the displacement magnitude Δdisp is greater than the determined magnitude threshold Δth, which corresponds to a moving state of the optical pointing device, then the output of comparator 403 transmits 0 to multiplexer 402 which enables a low hysteresis value ($V_{Lhyst}$) of comparator 401 allowing it to detect small changes in intensity differences between pixels and therefore easily detect motion. Thus the optical pointing device is adapted to easily track motion when moving even on low contrast surfaces. In the other case, while the displacement magnitude Δdisp is lower than the determined magnitude threshold Δth, which corresponds to a non-moving or rest state of the optical pointing device, then the output of comparator 403 transmits 1 to multiplexer 402 which enables a high hysteresis value ($V_{Hhyst}$) of comparator 401 allowing it not to detect small changes in intensity differences between pixels and therefore avoid detection of spurious motion when the optical pointing device is at rest, i.e. not moving.

According to the represented example of comparator 401, it comprises an amplifier 404, two adders and dividers by two 405 and 406, four switches 407-410 and one flip-flop D. Adders 405 and 406 receive on the one hand, either the low hysteresis value ($V_{Lhyst}$) or the high one ($V_{Hhyst}$) according to the signal generated by control unit 340, and on the other hand, the voltage V1, respectively V2. Switches 407-410 are controlled by the last comparator output value '0' or '1' which is stored for example by means of a flip-flop D connected between the comparator output and each of switches 407-410.

Thus, when the last comparator value is '0', which for example is representative of a negative edge, switches 407 and 410 are closed and then amplifier 404 receives at its first input voltage V1 and at its second input a voltage $V'2_{H/L}$ depending from voltage V2 and hysteresis voltage $V_{Lhyst}$ or $V_{Hhyst}$ received by adder 406. In the same manner, when the last comparator value is '1', which for example is representative of a positive edge, switches 408 and 409 are closed and then amplifier 404 receives at its first input a voltage $V'1_{H/L}$ depending from voltage V1 and hysteresis voltage $V_{Lhyst}$ or $V_{Hhyst}$ received by adder 405 and at its second input voltage V2.

According to this example, comparator hysteresis values are set with "hard" values chosen in function of the average light intensity of pixels in normal operating conditions on a normal surface. For an average pixel intensity around 200 mV, the low hysteresis value selected when the optical motion sensing device moving, is advantageously set to a first hard hysteresis value being between +/−0 and 5 mV, and preferably +/−2.5 mV (i.e. total hysteresis window being of 5 mV) and the high hysteresis value selected when the optical motion sensing device is at rest, is advantageously set to another hard hysteresis value being between +/−5 to 10 mV, and preferably of +/−7.5 mV (i.e. total hysteresis window being of 15 mV).

Figure 5:
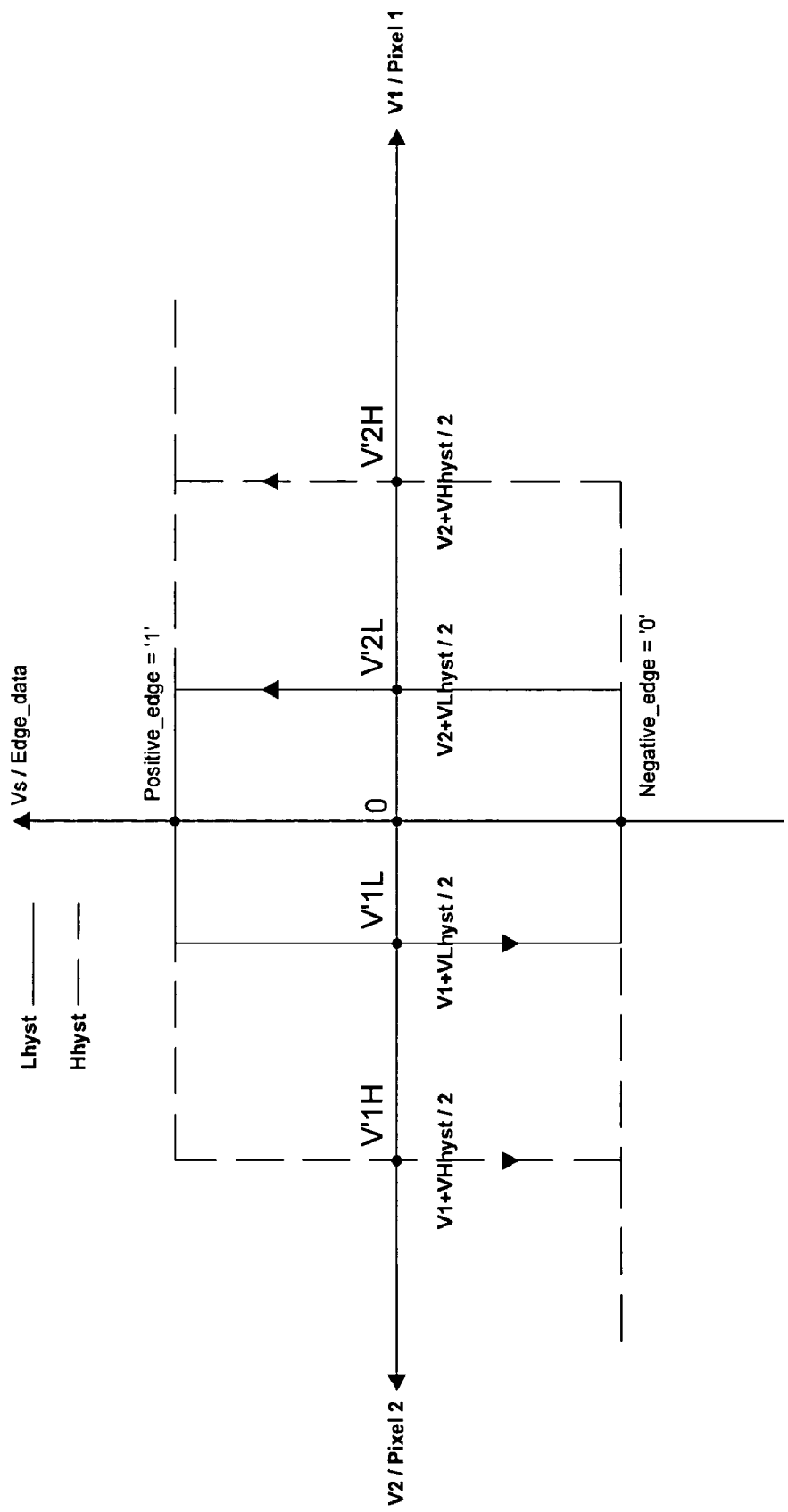

FIG. 5 shows a diagram of edge data outputted by each comparator 401 shown in FIG. 4a with respect to which hysteresis value, low or respectively high, is selected according to whether the optical pointing device is moving or respectively at rest. The spotted, respectively continuous, lines correspond to the high, respectively low, hysteresis setting.

In the represented example of FIG. 5, when the optical pointing device is moving, i.e. the low hysteresis value being selected, if the intensity of the first pixel (V1) is higher than the intensity of the second pixel plus the low hysteresis value divided by two ($V2+V_{Lhyst}/2=V'2_L$) then the comparator output outputs a positive edge. If the intensity of the second pixel (V2) is higher than the intensity of the first pixel plus the low hysteresis value divided by two ($V1+V_{Lhyst}/2=V'1_L$) then the comparator output outputs a negative edge. In between these two conditions, the comparator output remains unchanged.

In the same manner, when considering the optical pointing device as being at rest, i.e. the high hysteresis value being selected, if the intensity of the first pixel (V1) is higher than the intensity of the second pixel plus the hysteresis value divided by two ($V2+V_{Hhyst}/2=V'2_H$) then the comparator output outputs a positive edge. If the intensity of the second pixel (V2) is higher than the intensity of the second pixel plus the high hysteresis value divided by two ($V1+V_{Hhyst}/2=V'1_H$) then the comparator output outputs a negative edge. In between these two conditions, the comparator output remains unchanged.

FIG. 4b is a schematic illustration of another implementation example of a comparator of comparator array 315 with two relative hysteresis levels. It differs from FIG. 4a, in that adders and dividers by two 405 and 406 have been replaced by multipliers 411 and 412, and in that the selected hysteresis values are no longer hard values but relative hysteresis values in the form of coefficients K1 and K2 depending from pixels intensities and selected in function of the optical pointing device state, i.e. moving or at rest.

First value K1 is selected when the optical pointing device is moving and K2 which is greater than K1 is selected when the optical pointing device is at rest, both coefficients K1 and K2 being greater than 1. Thus, according to the represented example, when the last comparator value is '0', which for example is representative of a negative edge, switches 407 and 410 are closed and then amplifier 404 receives at its first input voltage V1 and at its second input a weighted voltage K1*V2 or K2*V2 depending from which coefficient K1 or K2 is selected by control unit 340. In the same manner, when the last comparator value is '1', which for example is representative of a positive edge, switches 408 and 409 are closed and then amplifier 404 receives at its first input a weighted voltage K1*V1 or K2*V1 depending from which coefficient K1 or K2 is selected by control unit 340 and at its second input voltage V2.

According to this specific example, comparator hysteresis windows are set with coefficients K1 and K2 chosen in function of the desired relative pixel intensity delta to be detected. The low hysteresis coefficient K1 selected when the optical motion sensing device moving, is advantageously chosen between 1.00 and 1.025, and is preferably 1.0125. The high hysteresis coefficient K2 selected when the optical pointing device is at rest, is advantageously chosen between 1.025 and 1.05, and is preferably 1.0375. Such relative values of hysteresis are advantageous in the sense that they scale with the actual pixels voltage output. Further, the chosen values have shown really good results for detecting motion even on low contrast surfaces when moving and for noise immunity, for preventing false motion reports and for saving power when at rest.

Figure 6:
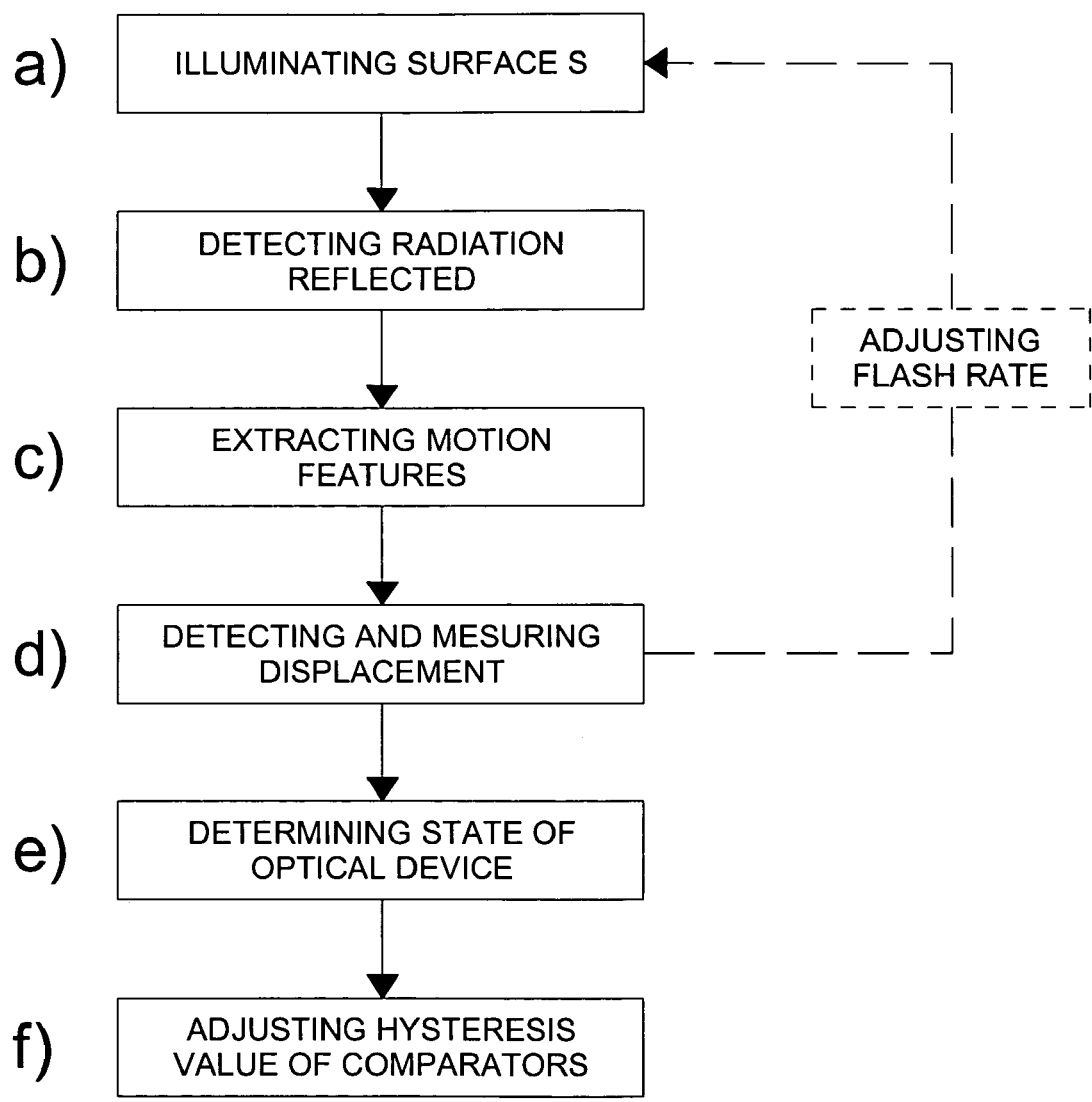
FIG. 6 shows the different steps of two methods according to the present invention.

FIG. 6 is a diagram of a method for adjusting the hysteresis value of the comparators of the comparator array according to the invention. This method for operating an optical motion sensing device comprising a light source and a photodetector device, comprising the steps of illuminating a surface portion with radiation by means of the light source (step a); detecting radiation patterns reflected from the illuminated surface portion by means of the photodetector device (step b); extracting motion features from the detected radiation patterns by comparing intensity between pixels of the photodetector device by means of comparators with a determined hysteresis threshold (step c); detecting and measuring displacement with respect to the illuminated surface portion based on the extracted motion features (step d); determining whether the optical motion sensing device is moving or at rest (step e); adjusting the determined hysteresis threshold of the comparators between at least a low and a high hysteresis values, consisting in selecting the low hysteresis value when the optical motion sensing device is moving and selecting the high hysteresis value when the optical motion sensing device is at rest (step f).

Advantageously, according to the aforecited first variant, an adjusting flash rate procedure as previously described is implemented after detection and measurement of displacement (step d) and before the next flash for illuminating the surface portion S (step a) and used to determine the optical device state (step e).

Extracted motion features extracted at step c) are obtained by the comparator means coupled to the photodetector device. These comparator means compare light intensity between neighbouring pixels of the photodetector device and outputs edge direction data from the detected light intensity pattern, which data is descriptive of light intensity differences between said neighbouring pixels and includes a first edge condition, or positive edge, defined as a condition wherein the light intensity of a first pixel is less than the light intensity of a second pixel, and a second edge condition, or negative edge, defined as a condition wherein the light intensity of said first pixel is greater than the light intensity of said second pixel. However, one will also understand that the extracted motion features may be alternatively edge inflection data further extracted from edge direction data. Edge inflection data is descriptive of the succession of positive and negative edges and includes a first inflection condition, or peak, defined as the succession of a positive edge followed by a negative edge and a second inflection condition, or null, defined as the succession, of a negative edge followed by a positive edge. It should be mentioned at this point that some other methods for detecting light intensity differences and thus extracting motion features are known in the art (see for example U.S. Pat. No. 5,578,813 and U.S. Pat. No. 5,644,139) and may alternatively be used. For instance, these methods disclose a motion detection principle which is based on correlation of consecutive image frames outputted by the photodetector array. According to this motion detection principle, which is disclosed in relation with FIGS. 7 and 8 of these documents, comparison of light intensity is made between pixels of a sample frame and pixels of a reference frame prior to the sample frame.

Referring to FIG. 7a, related to the method described in relation with FIG. 6, step e) comprises the following sub-steps consisting in outputting motion reports that are each representative of a magnitude of the detected displacement (sub-step e1); comparing the magnitude of the detected displacement with a displacement threshold (sub-step e2); and determining whether the optical motion sensing device is moving when the detected displacement magnitude is higher than the displacement threshold or at rest when the detected displacement magnitude is lower than the displacement threshold (sub-step e3).

Referring now to FIG. 7b, according to the first variant of the method described in relation with FIG. 6, step e) comprises the following sub-steps consisting in outputting motion reports that are each representative of a magnitude of the detected displacement (sub-step e1); comparing the magnitude of the detected displacement with a displacement threshold (sub-step e2); increasing or decreasing the flash rate if the magnitude of the detected displacement is respectively greater or lower than the displacement threshold (sub-step e3); and determining that the optical motion sensing device is at rest if the flash rate is equal to or below the rest flash rate otherwise the optical motion sensing device is considered to be moving (sub-step e4).

Having described the invention with regard to certain specific embodiments, it is to be understood that these embodiments are not meant as limitations of the invention. Indeed, various modifications and/or adaptations may become apparent to those skilled in the art without departing from the scope of the annexed claims. For instance, the proposed embodiments are not necessarily limited to comparators, shown in FIGS. 4a and 4b, having only two hysteresis threshold values but alternatively may comprise three or more hysteresis threshold values, or a smoothly adjustable hysteresis threshold value in between a low and high hysteresis threshold values. One skilled in the art will also understand that many other known circuits of comparators with two or more hysteresis values can be implemented instead of the ones shown in FIGS. 4a and 4b. Obviously, the method should then be adapted in function of the number of hysteresis threshold values available. With three or more hysteresis threshold values step f) may consist in decreasing the determined hysteresis threshold to a lower hysteresis value when the optical motion sensing device is moving and increasing the determined hysteresis threshold to a higher hysteresis value when the optical motion sensing device is at rest. With a hysteresis threshold being smoothly adjustable between a low and high hysteresis values, step f) may then consist in smoothly decreasing the determined hysteresis threshold to the low hysteresis value when the optical motion sensing device is moving and increasing the determined hysteresis threshold to the high hysteresis value when the optical motion sensing device is at rest.

What is claimed is:

1. A method for operating an optical motion sensing device comprising a light source and a photodetector device, said method comprising the steps of:
   a) illuminating a surface portion with radiation by means of the light source;
   b) detecting radiation patterns reflected from the illuminated surface portion by means of the photodetector device;
   c) extracting motion features from the detected radiation patterns by comparing intensity between pixels of said photodetector device by means of comparators with a determined hysteresis threshold;

d) detecting and measuring displacement with respect to the illuminated surface portion based on said extracted motion features;

e) determining whether the optical motion sensing device is moving or at rest;

f) adjusting said determined hysteresis threshold of the comparators between at least a low hysteresis threshold value and a high hysteresis threshold value, by selecting a higher hysteresis threshold value, when the optical motion sensing device is at rest,than the hysteresis threshold value selected when the optical motion sensing device is moving.

2. The method of claim 1, wherein step e) comprises the following sub-steps:

e1) outputting motion reports that are each representative of a magnitude of the detected displacement;

e2) comparing the magnitude of the detected displacement with a displacement threshold; and e3) determining whether the optical motion sensing device is moving when said magnitude of the detected displacement magnitude is higher than said displacement threshold or at rest when said magnitude of the detected displacement magnitude is lower than said displacement threshold.

3. The method of claim 1, wherein steps a) to d) define a flash period that is repeated at a selected flash rate; and wherein step e) comprises the following sub-steps:

e1) outputting motion reports that are each representative of a magnitude of the detected displacement;

e2) comparing the magnitude of the detected displacement with a displacement threshold;

e3) increasing or decreasing the flash rate if the magnitude of the detected displacement is respectively greater or lower than the displacement threshold;

e4) determining that the optical motion sensing device is at rest if the flash rate is equal to or below a rest flash rate otherwise the optical motion sensing device is considered to be moving.

4. The method of claim 1, wherein the comparators for extracting motion features are provided with three or more hysteresis values, and wherein step f) further includes decreasing said determined hysteresis threshold to a lower hysteresis threshold value when the optical motion sensing device enters a moving state and increasing said determined hysteresis threshold to a higher hysteresis threshold value when the optical motion sensing device enters a rest state.

5. The method of claim 1, wherein the hysteresis threshold is smoothly adjustable between said low and high threshold hysteresis values by smoothly decreasing said determined hysteresis threshold to said low hysteresis threshold value when the optical motion sensing device is moving and increasing said determined hysteresis threshold to said high hysteresis threshold value when the optical motion sensing device is at rest.

6. An optical motion sensing device comprising:

a light source for illuminating a surface portion with radiation;

a photodetector device responsive to radiation reflected from the illuminated surface portion;

a comparator array comprising a plurality of comparators with a determined hysteresis threshold for extracting motion features by comparing intensity between pixels of said photodetector device;

a motion sensing unit coupled to the comparator array for detecting and measuring displacement with respect to the illuminated surface portion, wherein it further comprises a control unit for determining the state of the optical motion sensing device whether it is moving or at rest and adjusting the hysteresis threshold of said comparators of the comparator array between at least a low threshold value and a high threshold value as a function of the determined state, the hysteresis threshold value selected in the rest state being higher than the one selected in the moving state.

7. The optical motion sensing device of claim 6, wherein the motion sensing unit is adapted to output motion reports that are each representative of a magnitude of the detected displacement and wherein the control unit comprises a comparator for comparing the magnitude of the detected displacement with a displacement threshold.

8. The optical motion sensing device of claim 6, wherein the light source, the photodetector device and the motion sensing unit are operated during a defined flash period and at a selected flash rate, wherein the motion sensing unit is adapted to output motion reports that are each representative of a magnitude of the detected displacement, wherein the control unit comprises a comparator for comparing the magnitude of the detected displacement with a displacement threshold and wherein said control unit is further adapted for increasing or decreasing the flash rate as a function of the magnitude of the detected displacement.

9. The optical motion sensing device of claim 6, wherein said plurality of comparators of said comparator array comprise each three or more hysteresis threshold values.

10. The optical motion sensing device of claim 6, wherein said plurality of comparators of said comparator array comprise each an smoothly adjustable hysteresis threshold value in between said low and high hysteresis threshold values.

11. The optical motion sensing device of claim 6, wherein said low hysteresis threshold value and high hysteresis threshold value are chosen as percentages of the pixel intensity provided at one input of said comparators, said low hysteresis threshold value being chosen in between +/−0 to 2.5% of the pixel intensity and said high hysteresis threshold value being chosen in between +/−2.5 to 5%.

12. The optical motion sensing device of claim 6, wherein said low hysteresis threshold value and high hysteresis threshold value are defined voltage values chosen as a function of predetermined average pixel intensity.

13. An optical pointing device for controlling the position of a cursor on a display screen, comprising an optical motion sensing device including a light source for illuminating a surface portion with radiation, a photodetector device responsive to radiation reflected from the illuminated surface portion, a comparator array comprising a plurality of comparators with a determined hysteresis threshold for extracting motion features by comparing intensity between pixels of said photodetector device, a motion sensing unit coupled to the comparator array for detecting and measuring displacement with respect to the illuminated surface portion, wherein it further comprises a control unit for determining the state of the optical motion sensing device whether it is moving or at rest and adjusting the hysteresis threshold of said comparators of the comparator array between at least two hysteresis threshold values in function of the determined state, the hysteresis threshold value selected in the rest state being higher than the one selected in the moving state.

14. The optical pointing device of claim 13, wherein the motion sensing unit is adapted to output motion reports that are each representative of a magnitude of the detected displacement and wherein the control unit comprises a comparator for comparing the magnitude of the detected displacement with a displacement threshold.

15. The optical pointing device of claim 13, wherein the light source, the photodetector device and the motion sensing unit are operated during a defined flash period and at a selected flash rate, wherein the motion sensing unit is adapted to output motion reports that are each representative of a magnitude of the detected displacement, wherein the control unit comprises a comparator for comparing the magnitude of the detected displacement with a displacement threshold and wherein said control unit is further adapted for increasing or decreasing the flash rate as a function of the magnitude of the detected displacement.

16. The optical pointing device of claim 13, wherein said plurality of comparators of said comparator array comprise each three or more hysteresis threshold values.

17. The optical pointing device of claim 13, wherein said plurality of comparators of said comparator array comprise each an smoothly adjustable hysteresis threshold value in between said at least two hysteresis threshold values.

18. An optical pointing device for controlling the position of a cursor on a display screen, comprising an optical motion sensing device including a photodetector array for measuring the varying intensity pattern of a portion of a surface which is illuminated with radiation by means of comparators having a determined hysteresis threshold and for extracting information about the relative motion between the photodetector array and the illuminated portion of the surface and wherein said optical motion sensing device further comprises a control unit for determining the state of the optical motion sensing device whether it is moving or at rest and adjusting the hysteresis threshold of said comparators between at least two hysteresis threshold values in function of the determined state, the hysteresis threshold value selected in the rest state being higher than the one selected in the moving state.

19. An optical mouse for controlling the position of a cursor on a display screen, comprising an optical motion sensing device including a light source for illuminating a surface portion with radiation, a photodetector device responsive to radiation reflected from the illuminated surface portion, a comparator array comprising a plurality of comparators with a determined hysteresis threshold for extracting motion features by comparing intensity between pixels of said photodetector device, a motion sensing unit coupled to the comparator array for detecting and measuring displacement with respect to the illuminated surface portion, wherein it further comprises a control unit for determining the state of the optical motion sensing device whether it is moving or at rest and adjusting the hysteresis threshold of said comparators of the comparator array between at least two hysteresis threshold values in function of the determined state, the hysteresis threshold value selected in the rest state being higher than the one selected in the moving state.

20. The optical mouse of claim 19, wherein the motion sensing unit is adapted to output motion reports that are each representative of a magnitude of the detected displacement and wherein the control unit comprises a comparator for comparing the magnitude of the detected displacement with a displacement threshold.

21. The optical mouse of claim 19, wherein the light source, the photodetector device and the motion sensing unit are operated during a defined flash period and at a selected flash rate, wherein the motion sensing unit is adapted to output motion reports that are each representative of a magnitude of the detected displacement, wherein the control unit comprises a comparator for comparing the magnitude of the detected displacement with a displacement threshold and wherein said control unit is further adapted for increasing or decreasing the flash rate as a function of the magnitude of the detected displacement.

22. The optical mouse of claim 19, wherein said plurality of comparators of said comparator array comprise each three or more hysteresis threshold values.

23. The optical mouse of claim 19, wherein said plurality of comparators of said comparator array comprise each an smoothly adjustable hysteresis threshold value in between said at least two hysteresis threshold values.

24. An optical mouse for controlling the position of a cursor on a display screen, comprising an optical motion sensing device including a photodetector array for measuring the varying intensity pattern of a portion of a surface which is illuminated with radiation by means of comparators having a determined hysteresis threshold and for extracting information about the relative motion between the photodetector array and the illuminated portion of the surface and wherein said optical motion sensing device further comprises a control unit for determining the state of the optical motion sensing device whether it is moving or at rest and adjusting the hysteresis threshold of said comparators between at least two hysteresis threshold values in function of the determined state, the hysteresis threshold value selected in the rest state being higher than the one selected in the moving state.

* * * * *